United States Patent [19]

Magnusson

[11] 3,883,857

[45] May 13, 1975

[54] DIGIT REGENERATION IN TWO-OUT-OF-FIVE FORMAT CODE SYSTEMS

[75] Inventor: Stig E. Magnusson, Chicago, Ill.

[73] Assignee: GTE Automatic Electric Laboratories Incorporated, Northlake, Ill.

[22] Filed: Apr. 1, 1974

[21] Appl. No.: 456,585

[52] U.S. Cl. ...................... 340/173 R; 340/347 DD

[51] Int. Cl. ........................................... G11c 13/00

[58] Field of Search .......................... 340/173 R, 347

[56] References Cited

UNITED STATES PATENTS 3,763,480 11/1974 Weimer .......................... 340/173 R

*Primary Examiner*—Terrell W. Fears
*Attorney, Agent, or Firm*—Robert J. Black

[57] ABSTRACT

A technique for utilizing memories having word lengths of four bits in a system employing a two-out-of five code format. Four digits only are stored with the fifth digit regenerated on readout by logic circuitry connected in parallel to the memory system readout.

6 Claims, 3 Drawing Figures

DIGIT REGENERATION IN TWO-OUT-OF-FIVE FORMAT CODE SYSTEMS

BACKGROUND OF THE INVENTION

1. Field of the Invention

This invention relates to techniques for storing information coded on a two-out-of-five basis in telecommunication systems and more particularly to a system for storing only a portion of the coded information received in a memory of limited capacity, and on readout regenerating the non-stored information; supplying the regenerated information along with the stored information for use in a telecommunication system.

2. Description of the Prior Art

In telecommunication systems extensive use has been made of "self-checking" codes. By choosing the combinations of a code so that a single error produces a combination which is not valid in the code, the occurrence of an error can be detected. Codes of this nature are called self-checking codes. In such codes at least five elements are necessary to provide ten self-checking combinations for the decimal digits. A five-element self-checking code that uses ten combinations of five elements taken two at a time is known as a two-out-of-five code. The elements are designated 0, 1, 2, 4 and 7, and the combinations are additive except for 0 which is 4 and 7. With this type of code a single error resulting in the false operation or failure of a circuit element will leave either 1 or 3 circuit elements operated and thus may easily be detected. Because of its obvious advantage the two-out-of-five code has frequently been used in telephone communication systems including, for example, the registersender of the No. 1 Crosspoint Tandem System, manufactured by GTE Automatic Electric Incorporated.

While the use of two-out-of-five coding has become fairly commonplace in telecommunication systems, numerous electronic systems employ binary coding and as a consequence inexpensive commercially available memories have been made available for use in binary coded systems. Recently advances in integrated circuit techniques have reduced both size and cost of such memories to highly desirable levels. An example of this form of memory is the N7489 unit manufactured by Signetics Inc. This unit is a 64 bit read/write random access memory capable of storing 16 words each 4 bits.

To use such memories in systems employing two-out-of-five codes such as may be found in register senders, it would be possible to employ two such integrated circuit memories to provide the necessary storage for the five bits that are incorporated in each code. With two such units available, four bits would be stored in one unit and one in the second, leaving three bits per word of memory unused. Obviously this method is not economical.

Another technique that has been employed has been to convert the two-out-of-five code format to binary code for storage, then reconverting the stored information into two-out-of-five format upon reading the memory. In such a system conversion to binary would typically require one inverter, eight, two input NAND gates and three, three input NAND gates. To reconvert back to the two-out-of-five format would require a binary to decimal converter and five, four input NAND gates. The present invention describes a technique for utilizing commercially available memory units having a capacity for storage of only four bit words and regenerating the fifth bit at the time of memory readout, while using only a minimum of additional equipment for the purpose of regeneration.

SUMMARY OF THE INVENTION

The present invention is drawn to a technique for storing information coded on a two-out-of-five basis in a memory that provides storage capability for only four of the five information bits. Employed in the present invention is a Signetics No. N7489 random access memory or similar unit. As noted logic circuitry for regeneration of the non-stored bit is incorporated.

In the present invention two-out-of-five coded information representative of an address prefix and inlet identity digits for use in a register sender are received by a code receiver for transfer to memory. As each word consisting of 5 bits (bits 0, 1, 2, 4 and 7) are available at the output of the code receiver, address information directing where in the memory the information is to be stored is received from a call processing unit or similar control circuit. In response to this information, the code information and an enable signal from the call processing unit, four bits of information (bits 0, bit 1, bit 2 and bit 4) are written into the memory. The fifth bit (bit 7) is not used.

On receipt of a read signal from the call processing unit or other control circuitry, information is read out of the memory and extended to a register wherein the stored information is utilized as required. Connected to the read outputs of the memory is a regenerator circuit which in response to the coded information being read out identifies the digit being read out and accordingly supplies the fifth bit (bit 7) of information to the register simultaneously with those bits of information read directly from the memory. The resultant combination of bits provided to the register being exactly the same as those originally available from the two-out-of-five code receiver. In this manner valid information in a two-out-of-five coded format is stored in a memory requiring a storage capacity 20% less than a memory specifically adapted to meet the normal storage requirements of two-out-of-five coded information.

DESCRIPTION OF THE PREFERRED EMBODIMENT

Figure 1:
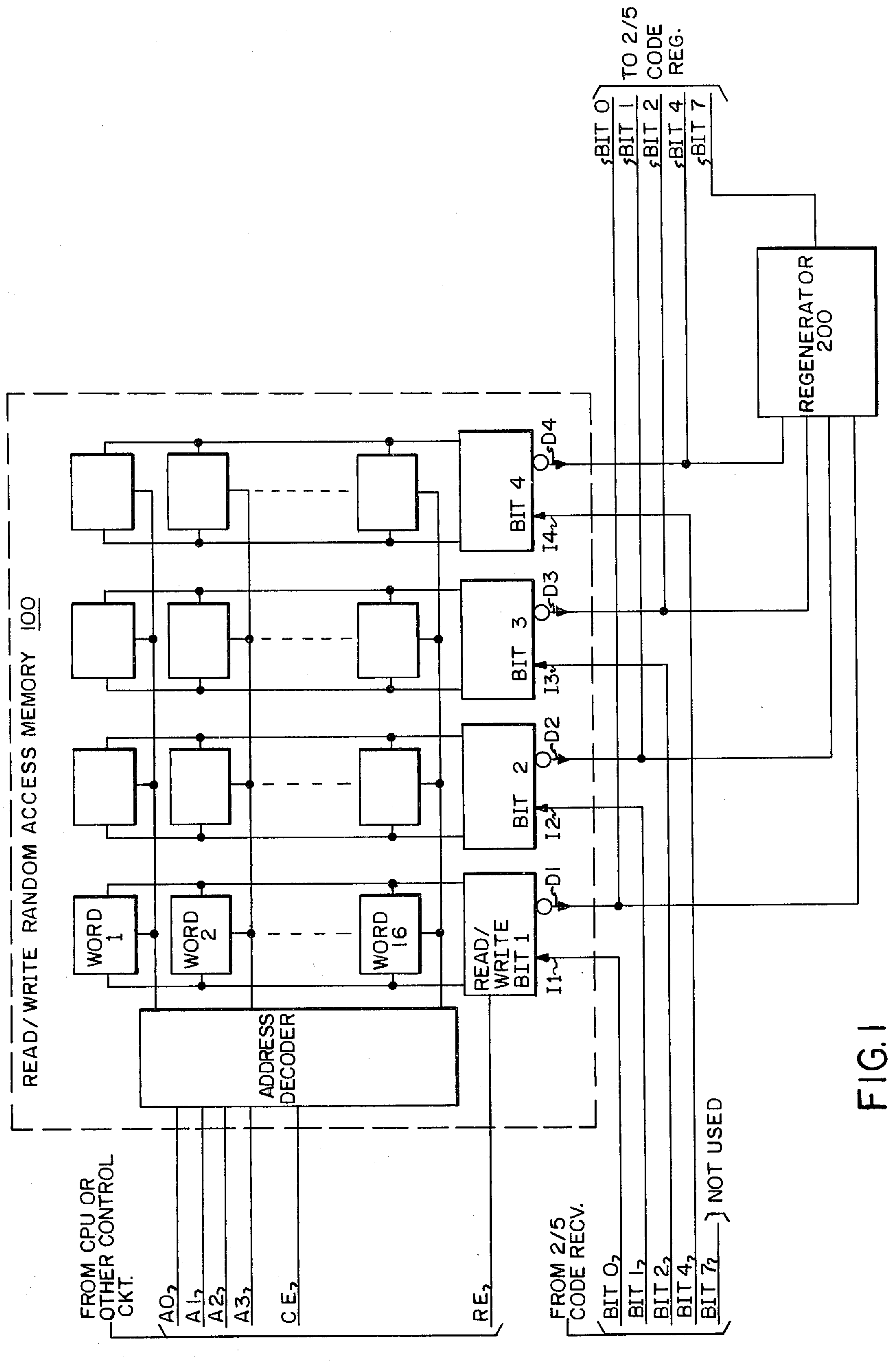
FIG. 1 is a block diagram of a memory useful for storing information coded in two-out-of-five format but storing only four bits of information, regenerating the fifth bit on readout in accordance with the present invention.

Referring now to FIG. 1 is a read/write random access memory 100 is shown. This unit as noted previously is commercially available. The specific memory shown has a capacity of 16 four-bit words, with each word being written into the memory in a location determined by an associated address decoder which operates under control of an associated call processing unit or similar control circuit. This occurs in conjunction with an address decoder "enable" signal received from the call processing unit and a logic "0" signal on lead RE from the associated call processing unit to the read/write circuitry. Coded address information in binary form for use with the present memory is applied on leads designated A0, A1, A2 and A3 while the enable signal for the memory circuit is applied to lead CE. Readout of the memory is accomplished by application of a logic 1 on lead RE from the associated call processing unit. Information to be written into the memory is applied on the four parallel leads connected to the read/write bit circuits that form a portion of the memory.

Detailed operation of the memory does not form a portion of the present invention. It will also be obvious to those skilled in the art that other forms of memory may also be employed, the single requirement being that they have a capability for storing four bit words when used in conjunction with storage of two-out-of-five coded information. The type of access employed is unimportant and may instead of the random access shown be direct, sequential, etc.

Each read/write bit circuit included in memory 100 in addition to receiving input information from an associated two-out-of-five code receiver provides an output for 4 bits (bit 0, bit 1, bit 2 and bit 4) to a connected two-out-of-five code register. This information stored in the memory and readout on command will be utilized by the register in performing its functions.

It should be noted at this time that in the particular memory shown that readout is provided on an inverted basis, accordingly the connected regenerator circuit 200 in performing the necessary logic for regenerating the fifth bit (bit 7) operates on the basis of receiving the complement of the information originally stored. It should be pointed out however that identical techniques would be employed if the information as readout were in the same form as directly received from the code receiver and not in complementary form.

Figure 2A:
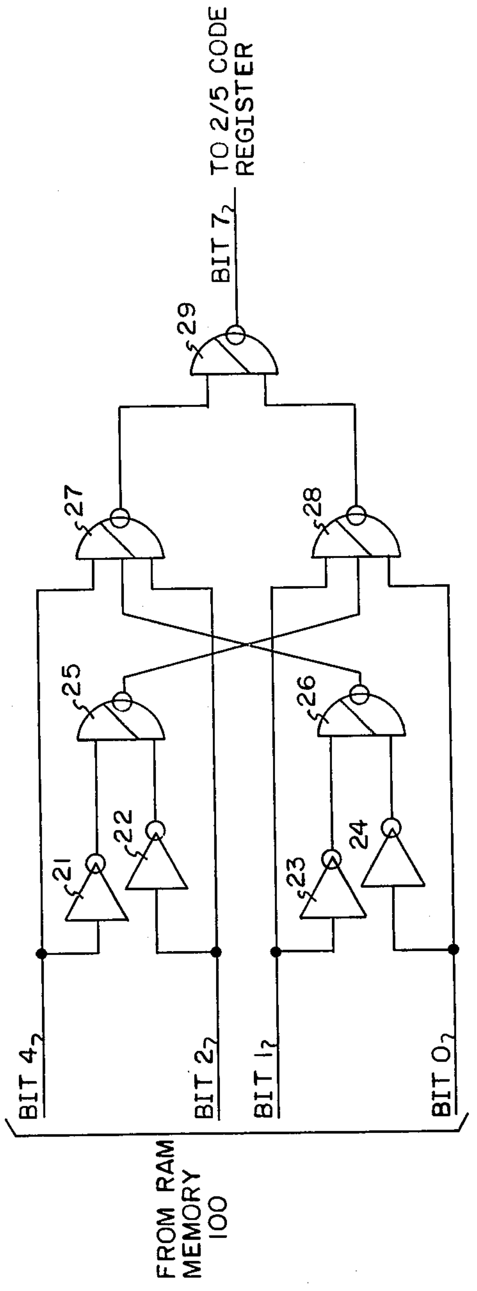
FIG. 2A is a logic diagram of one form of regenerator circuit for use with the present invention.
Figure 2B:
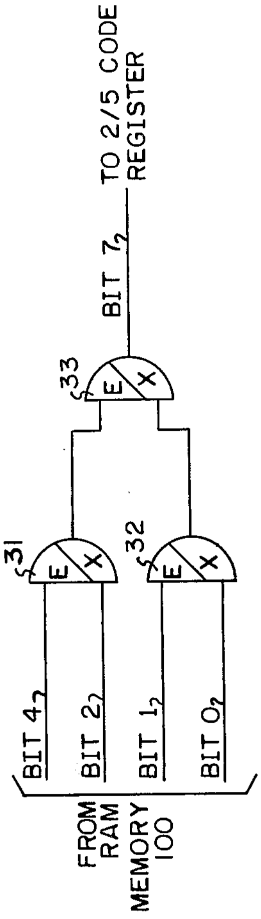
FIG. 2B is a logic diagram of another form of regenerator for use with the system of the present invention.

The regenerator 200 may be implemented as shown in FIGS. 2A and 2B. Referring now to FIG. 2A the regenerator circuitry is connected to the read outputs of memory 100 and specifically to the read/write circuitry, wherein the bit 0, bit 1, bit 2 and bit 4 information are readout. Bit 0 and bit 1 information are connected to the inputs of three input NAND gate 28 while bit 2 and bit 4 information is connected directly to three input NAND gate 27. Also bit 0 and bit 1 information is inverted by inverters 24 and 23 respectively whose outputs are connected to the input of two input NAND gate 26 whose output is connected to the third input of NAND gate 27 while bits 2 and 4 are inverted by inverters 22 and 21 respectively whose outputs are connected to the input of two input NAND gate 25 whose output is connected to the third input of NAND gate 28. The outputs of NAND gates 27 and 28 are coupled to the inputs of NAND gate 29 whose output provides the fifth bit (bit 7) to the associated two-out-of-five code register.

Referring now to FIG. 2B this embodiment of the regenerator circuit, employs use of EXCLUSIVE OR gates with bit 0 and bit 1 information from the memory being coupled to two input EXCLUSIVE OR gate 32 while bit 2 and bit 4 information is coupled to the inputs of two input EXCLUSIVE OR gate 31. The outputs of EXCLUSIVE OR gate 31 and 32 are coupled to the inputs of EXCLUSIVE OR gate 33 whose output provides the fifth bit (bit 7) to the associated two-out-of-five code register.

For a complete understanding of the present invention two-out-of-five encoding for decimal digits 1 through 9 and 0 are as follows:

| DECIMAL DIGIT | BIT 0 | BIT 1 | BIT 2 | BIT 4 | BIT 7 |
|---|---|---|---|---|---|
| 1 | 1 | 1 | 0 | 0 | 0 |
| 2 | 1 | 0 | 1 | 0 | 0 |
| 3 | 0 | 1 | 1 | 0 | 0 |
| 4 | 1 | 0 | 0 | 1 | 0 |
| 5 | 0 | 1 | 0 | 1 | 0 |
| 6 | 0 | 0 | 1 | 1 | 0 |
| 7 | 1 | 0 | 0 | 0 | 1 |
| 8 | 0 | 1 | 0 | 0 | 1 |
| 9 | 0 | 0 | 1 | 0 | 1 |
| 0 | 0 | 0 | 0 | 1 | 1 |

From the above it may be observed that the first four bits (bit 0, bit 1, bit 2 and bit 4) of each of the decimal digits, has a separate and distinct code. It also may be observed that in the cases of digits 1–6 that 2 bits out of the first 4 always are true or in the 1 state (conversely 2 bits of the first 4 are also in the false or 0 state). It can also be seen that for the digits 7, 8, 9 and 0 that only one bit is true or in the 1 state. From the above it may be observed that for decimal digits 1–6, bit 7 is a false or 0 value and for digits 7, 8, 9 and 0 bit 7 is true or 1 value.

Accordingly the logic circuitry employed in the regenerator circuit showing FIGS. 2A and 2B is designed to examine the four bits stored in the associated memory and upon detecting the presence of two 1 states being read out of the memory, it will generate a 0 output. Likewise in response to detection of but a single true or 1 condition being readout of the memory, the logic circuitry will generate a 1 output for transmission to the associated two-out-of-five code register in parallel with the information being read directly out of the memory.

As noted previously in the embodiment shown information being readout of the particular memory used in this embodiment is in its inverted form. The information supplied by the regenerator is not in the inverted form. The register performs the necessary inversions to correct for this.

An example of the operation of the logic circuitry of FIG. 2A when the codes for the decimal digit 1 is being readout of the memory would be as follows: because the digit being readout is 1, the signals available at bits 0 and 1 would be 0 and at bits 2 and 4, 1. Under these conditions the outputs of inverters 21 and 22 will each be 0's and the outputs of inverters 23 and 24 will each be 1, hence the output of NAND gates 25 and 26 will be 1 and 0 respectively. The inputs then for NAND gate 27 will be 1 for those inputs connected directly to bits 4 and 2 and will be 0 on that input connected to the output of NAND gate 26. The inputs to NAND gate 28 will be two 0's based on the condition of the inputs designated bit 1 and bit 0 and a 1 on that input connected to the output of NAND gate 25; as a result 1's will be present on the outputs of both gates 27 and 28. These conditions then are applied to the inputs of NAND gate 29 resulting in a 0 output on the bit 7 lead extending to the associated two-out-of-five code register.

If the decimal digit stored in the memory and being readout is 0, the conditions at the inputs to the logic circuitry of FIG. 2A will be 1's on leads designated bit 0, bit 1 and bit 2 and a 0 on the lead designated bit 4.

From the above it will be seen that 0's are present at the outputs of inverters 22, 23 and 24 and a 1 from the output of inverter 21. In response to the presence of both 0's on the inputs to gate 26, the output of gate 26 will be a 1 which will be extended to gate 27 while the combination of a 1 and 0 on the inputs of gate 25 will also generate a 1 output for application to the input of gate 28. Gate 28 it will be observed has all three of its inputs at stage 1 resulting in a 0 output, while gate 27 with a 1 state present on two of its inputs and a 0 state present on the other will produce a 1 output; a combination of outputs from gates 27 and 28 of a 1 and 0 state applied to the input of gate 29 will result in a state 1 output for bit 7.

In a similar manner the circuitry of FIG. 2B also operates to detect the number of bits that are in the 1 condition of the word being readout of memory. FIG. 2B however relies on the particular characteristics of EXCLUSIVE OR gate circuitry wherein 1 or true states are only produced as outputs in response to two different inputs. Accordingly if the digit 1 were being readout of memory, a 1 signal would be present on the bit 4 and bit 2 inputs and 0 present on the bit 1 and bit 0 inputs. EXCLUSIVE OR gate 31 seeing two identical inputs will produce a 0 output as would EXCLUSIVE OR gate 32 which also would have two similar input conditions. Since the outputs of gates 31 and 32 are both 0 and are both applied to the inputs of EXCLUSIVE OR gate 33, gate 33 also will generate a 0 output on the bit 7 lead.

If the digit being readout of memory is a 0 as evidenced by a 0 on the bit 4 input to the logic circuitry of FIG. 2B and the 1 condition is present on bits 2, 1 and 0, respectively, it will be obvious that gate 32 with both of its inputs identical will generate a 0 output while gate 31 having a 0 on one input and a 1 on the other, will generate a 1 output. The outputs of gates 31 and 32 being dissimilar when applied to the input of EXCLUSIVE OR gate 33, will cause generation of a "1" or "true" condition on the bit 7 output lead extending to an associated two-out-of-five code register. As noted above, inversion of this signal to correspond to the inverted forms of the bit signals available on the other outputs from a memory connected directly to the associated two-out-of-five code register would be necessary.

Regeneration of the digits 2 through 9 utilizing the logic circuitry of either FIG. 2A or 2B will be similar to the examples outlined above.

While only selected embodiments of the present invention have been disclosed, it will be obvious to those skilled in the art that numerous modifications of the present invention may be made without departing from the spirit of the invention whose scope shall be limited only by the claims appended hereto.

What is claimed is:

1. A memory system connected between, a source of five element coded signals and an output circuit, and including circuit connections to a control circuit, said memory system comprising:

storage means initially operated in response to said control circuit to store four elements of each of said coded signals from said signal source and further operated in response to said control circuit to readout said four stored elements; regeneration means connected between said storage means and said output circuit, operated in response to said four elements readout of said storage means to regenerate the fifth element of each coded signal, and transmit said fifth element to said output circuit;

and said output means operated in response to the combination of said four elements of said coded signals readout of said storage means and said fifth element of said coded signals received from said regeneration means.

2. A memory system as claimed in claim 1 wherein said regeneration means comprise: a logic circuit operated to generate an output signal of a first value in response to two elements of said coded signals readout of said memory being of one value and the other two elements readout being of another value, and operated to generate an output signal of a second value in response to three elements of said coded signals readout of said memory being of one value and the other element readout being of another value.

3. A memory system as claimed in claim 1 wherein said regeneration means comprise: first and second gate circuits;

first and second inverter circuits connected between said storage means and said first gate circuit; third and fourth inverter circuits connected between said storage means and said second gate circuit; a third gate circuit including a circuit connection to said output circuit; a fourth gate circuit connected between said storage means and said third gate circuit and including an input circuit connection from said second gate circuit; and a fifth gate circuit connected between said storage means and said third gate circuit and including an input circuit connection from said first gate circuit.

4. A memory system as claimed in claim 3 wherein: each of said gate circuits are NAND gates.

5. A memory system as claimed in claim 1 wherein said regeneration means comprise: first and second gate circuits each connected to said storage means; and a third gate circuit including input circuit connections to each of said first and second gate circuits and an output circuit connection to said output circuit.

6. A memory system as claimed in claim 5 wherein: each of said gate circuits is an EXCLUSIVE OR gate.

* * * * *